(12) United States Patent
Derckx et al.

(10) Patent No.: US 11,868,458 B2
(45) Date of Patent: Jan. 9, 2024

(54) APPARATUS AND METHOD FOR A MULTI-LAYER PIXEL STRUCTURE

(71) Applicant: TOUCH BIOMETRIX LIMITED, Wales (GB)

(72) Inventors: Henricus Derckx, St Asaph (GB); Wilhelmus Van Lier, St Asaph (GB); Michael A. Cowin, St Asaph (GB)

(73) Assignee: TOUCH BIOMETRIX LIMITED, St. Asaph (GB)

(*) Notice: Subject to any disclaimer, the term of this patent is extended or adjusted under 35 U.S.C. 154(b) by 0 days.

(21) Appl. No.: 17/616,477

(22) PCT Filed: Jun. 5, 2020

(86) PCT No.: PCT/GB2020/051369
§ 371 (c)(1),
(2) Date: Dec. 3, 2021

(87) PCT Pub. No.: WO2020/245602
PCT Pub. Date: Dec. 10, 2020

(65) Prior Publication Data
US 2022/0236833 A1    Jul. 28, 2022

(30) Foreign Application Priority Data

Jun. 5, 2019  (GB) .................................. 1907998
Jun. 5, 2019  (GB) .................................. 1908040
(Continued)

(51) Int. Cl.
*G06F 21/32*  (2013.01)
*G06F 3/044*  (2006.01)
(Continued)

(52) U.S. Cl.
CPC .......... *G06F 21/32* (2013.01); *G06F 3/03543* (2013.01); *G06F 3/03547* (2013.01);
(Continued)

(58) Field of Classification Search
None
See application file for complete search history.

(56) References Cited

U.S. PATENT DOCUMENTS 9,465,491 B2    10/2016  Shaikh et al.
2002/0122026 A1  9/2002  Bergstrom
(Continued)

FOREIGN PATENT DOCUMENTS

CN    205091713 U    3/2016
CN    105528592      4/2016
(Continued)

OTHER PUBLICATIONS

Search & Exam Report issued in Appl. No. GB1908040.7 (dated Jul. 30, 2019).
(Continued)

*Primary Examiner* — Nicholas J Lee
(74) *Attorney, Agent, or Firm* — Barnes & Thornburg LLP

(57) ABSTRACT

The present disclosure provides a pixel structure comprising a plurality of layers for providing a touch sensitive pixel of a sensing array. The layers comprising: a thin film transistor; and a conductive layer deposited on a dielectric shield to be touched by an object to be sensed and arranged to provide a capacitive sensing electrode coupled to the thin film transistor. The present disclosure also provides methods of manufacturing such a pixel structure.

15 Claims, 9 Drawing Sheets

(30) Foreign Application Priority Data

Jun. 26, 2019 (GB) .................................... 1909209
Sep. 26, 2019 (GB) .................................... 1913912

(51) Int. Cl.
| | | |
|---|---|---|
| G06F 3/041 | (2006.01) | |
| G06F 3/0354 | (2013.01) | |
| G06F 21/44 | (2013.01) | |
| H01L 27/12 | (2006.01) | |
| G06V 40/12 | (2022.01) | |
| G06V 40/13 | (2022.01) | |

(52) U.S. Cl.
CPC ............ *G06F 3/044* (2013.01); *G06F 3/0446* (2019.05); *G06F 3/041661* (2019.05); *G06F 21/44* (2013.01); *G06V 40/1359* (2022.01); *H01L 27/127* (2013.01); *H01L 27/1255* (2013.01); *G06F 2203/0336* (2013.01); *G06V 40/1306* (2022.01); *H01L 27/1218* (2013.01)

(56) References Cited

U.S. PATENT DOCUMENTS

| | | | |
|---|---|---|---|
| 2008/0030302 | A1 | 2/2008 | Franza et al. |
| 2012/0026117 | A1 | 2/2012 | Schneider et al. |
| 2013/0287274 | A1 | 10/2013 | Shi et al. |
| 2014/0077827 | A1 | 3/2014 | Seguine |
| 2014/0266262 | A1 | 9/2014 | Taghibakhsh |
| 2014/0333328 | A1 | 11/2014 | Nelson et al. |
| 2015/0049046 | A1* | 2/2015 | Tan ................ G09G 3/325 345/173 |
| 2015/0070137 | A1 | 3/2015 | Minteer et al. |
| 2016/0034739 | A1 | 2/2016 | Chin |
| 2016/0098140 | A1 | 4/2016 | Lee et al. |
| 2016/0328593 | A1 | 11/2016 | Ho |
| 2016/0364591 | A1 | 12/2016 | El-Khoury et al. |
| 2016/0378225 | A1 | 12/2016 | Wang et al. |
| 2017/0140194 | A1 | 5/2017 | Qin et al. |
| 2017/0336906 | A1 | 11/2017 | Yoon et al. |
| 2017/0344141 | A1 | 11/2017 | Lee |
| 2018/0025203 | A1 | 1/2018 | Lee et al. |
| 2018/0314363 | A1 | 11/2018 | Yoon et al. |

FOREIGN PATENT DOCUMENTS

| | | |
|---|---|---|
| EP | 1469416 | 10/2004 |
| WO | 01/59558 | 8/2001 |
| WO | 2004/036484 | 4/2004 |
| WO | 2018/124334 | 7/2018 |
| WO | 2018/222866 | 12/2018 |

OTHER PUBLICATIONS

Search & Exam Report issued in Appl. No. GB1907998.7 (dated Aug. 6, 2019).
Search & Exam Report issued in Appl. No. GB190496.8 (dated Oct. 22, 2020).
Search & Written Opinion issued in Appl. No. PCT/GB2020/051369 (dated Sep. 15, 2020).
Third party observations submitted in Appl. No. GB2585759 (dated Jan. 21, 2020).
Search & Exam Report issued in Appl. No. GB2008505.6 (dated Nov. 24, 2020).
Search & Written Opinion issued in Appl. No. PCT/GB2020/051373 (dated Oct. 5, 2020).
Examination Report issued in EP20739761.3 (dated Oct. 13, 2023).

* cited by examiner

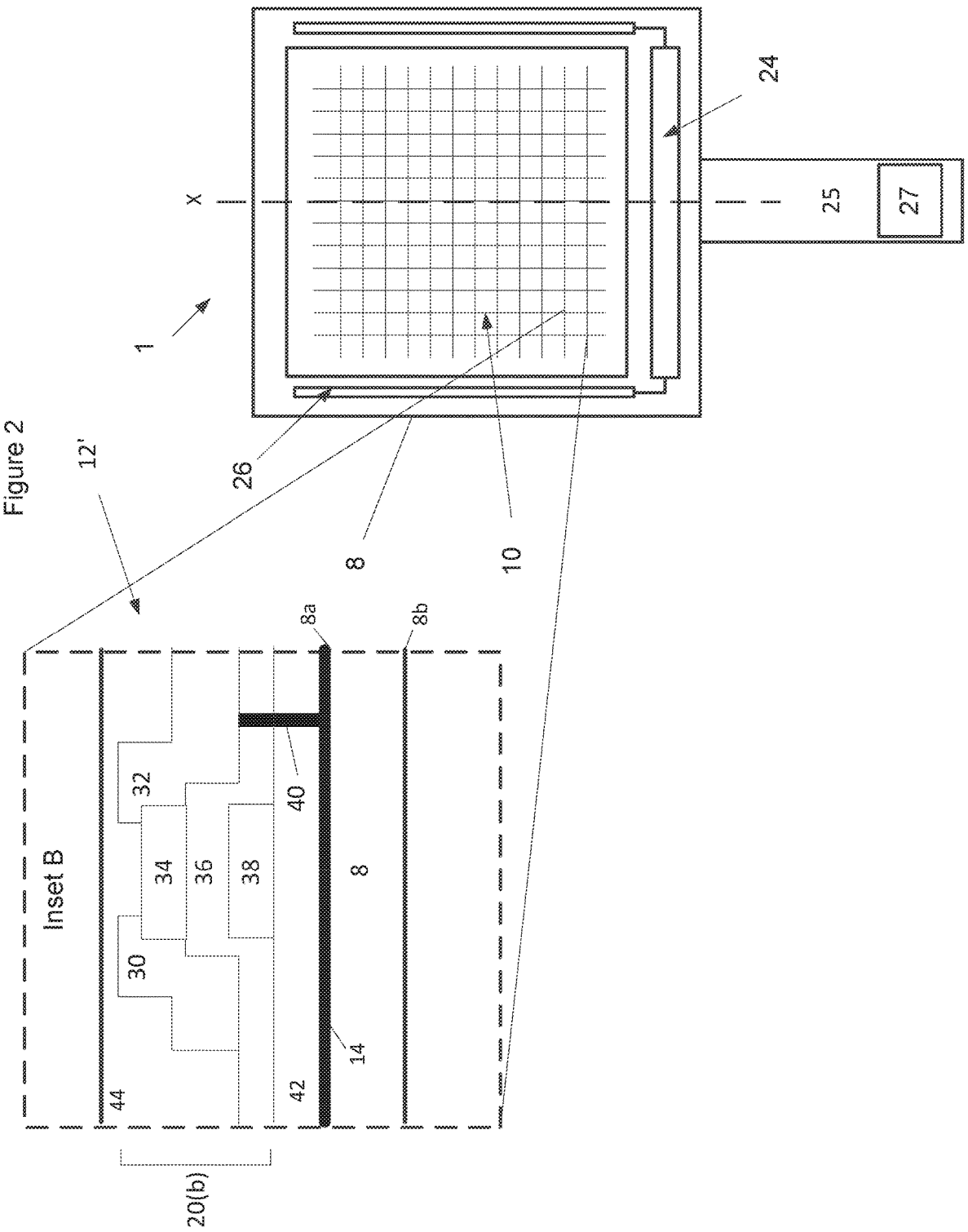

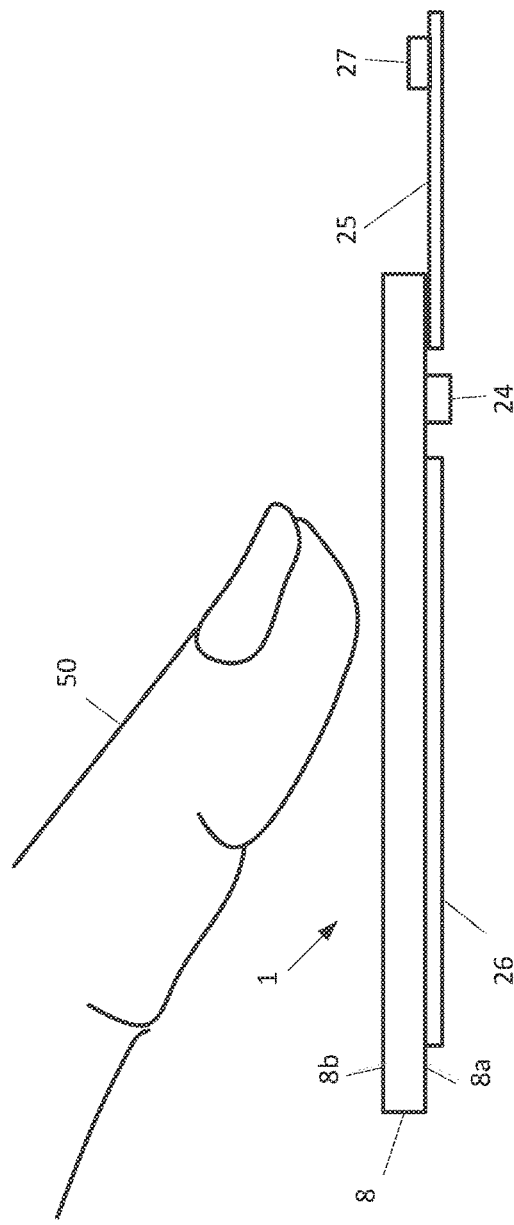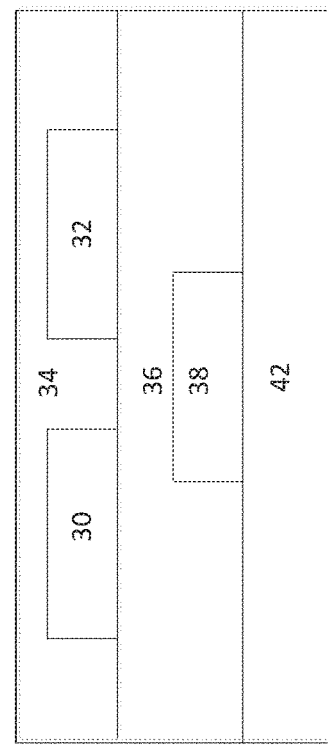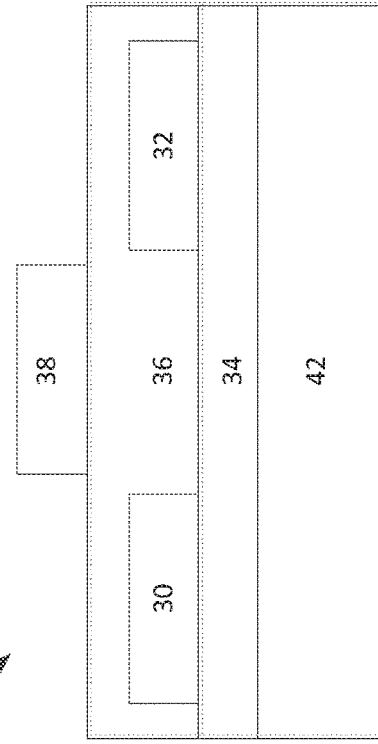

APPARATUS AND METHOD FOR A MULTI-LAYER PIXEL STRUCTURE

CROSS-REFERENCE TO RELATED APPLICATIONS

This application is a US National Stage Application under Section 371 of PCT/GB2020/051369, filed on Jun. 5, 2020, which claimed priority from the following four (4) United Kingdom patent applications: 1907998.7, filed on Jun. 5, 2019; 1908040.7, filed on Jun. 5, 2019; 1909209.7, filed on Jun. 26, 2019; and 1913912.0, filed on Sep. 26, 2019, the entirety of each are hereby fully incorporated by reference herein.

FIELD OF INVENTION

The present invention relates to apparatus and methods, and more particularly to touch sensitive surfaces, and methods of manufacturing such surfaces.

BACKGROUND

Secure, verifiable authentication, of user identity is an increasingly important part of all technology. To give just a few examples, it plays a part in:
- user equipment (UE) used for communication and consumer access to media content,
- computer devices and systems which store and provide access to sensitive data,
- devices and systems used for financial transactions,
- access control for buildings,
- access control for vehicles, and
- personalised devices, such as keys, remote controllers, alarm systems, cameras, etc.

Biometric measurement of the user is now prevalent in all of these contexts and others. Biometric measures such as iris scanning, and facial recognition are dependent on lighting and field of view of a camera. It may also be possible to circumvent such security measures by presenting a video or photo of the user, or a user body part, such as an iris or fingerprint to the camera.

Fingerprint sensors have been thought of as being more secure, but it is possible also to overcome the security they provide, and the manufacturing requirements of such sensors makes it difficult to integrate them into other electronic devices such as mobile telephones and other UEs. In particular, fingerprint sensing demands very high resolution—at least hundreds of pixels per inch.

One example of such a sensor is Apple Inc's Touch ID (RTM). This sensor is based on a laser-cut sapphire crystal. It uses a detection ring around the sensor to detect the presence of the user's finger. The Touch ID (RTM) sensor uses capacitive touch sensing to detect the fingerprint, and has a 500 pixel per inch (PPI) resolution.

Capacitance sensors such as these use capacitive effects associated with the surface contours of the fingerprint. The sensor array pixels each include an electrode which acts as one plate of a capacitor, the dermal layer (which is electrically conductive) acts as the other plate, and the non-conductive epidermal layer acts as a dielectric. The total dielectric may comprise the non-conductive epidermal layer plus the dielectric protection layer on top of the pixel electrode. The capacitance is greater where the dermis is closer to the pixel electrode, and so the surface contours of the skin can be sensed by measuring the capacitance of each pixel (e.g. based on the charge accumulated on the pixel electrode) and assembling an image from those pixels.

Both passive matrix and active matrix capacitive touch sensors have been proposed. Most so-called passive capacitive touch sensing systems use an external driving circuit (such as an integrated circuit, IC) to drive a matrix of passive electrodes, and a separate readout circuit (e.g. an IC) to readout charge stored on these electrodes during the drive cycle. The stored charge varies dependent on the tiny capacitance changes due to touch events. Passive electrode systems are sensitive to environmental noise and interference and resolution is limited compared to, for example, active matrix sensors having active elements.

Active matrix capacitive touch sensors include a switching element in each pixel. The switching element may control a conduction path between the capacitive sensing electrode in the pixel, and an input channel to an ADC in a read-out circuit. Typically each column of pixels in an active array is connected to one such input channel. The charge stored in the array can thus be read from the active matrix by controlling the switching elements to connect each row of pixels, for example one-by-one (although multiplexing can also be used in larger area devices), to the ADC.

Each pixel needs to be connected to the read-out circuit, and all of the pixels of each column are effectively connected in parallel. The parasitic capacitance associated with each pixel therefore combines additively. This places an inherent limit on the number of pixels that can be combined together in any one column as pixel capacitance is small compared to column capacitance. This in turn limits the size and/or resolution of a capacitive touch sensor.

There thus remains a significant unmet commercial need for large area high resolution touch sensors.

SUMMARY

Aspects and examples of the invention are set out in the claims and aim to address at least a part of the above described technical problem, and other problems.

According to a first aspect there is provided a pixel structure comprising a plurality of layers for providing a touch sensitive pixel of a sensing array, the layers comprising: a thin film transistor; and a conductive layer deposited on a dielectric shield to be touched by an object to be sensed and arranged to provide a capacitive sensing electrode coupled to the thin film transistor.

Advantageously, the dielectric shield providing the substrate for the layers to be disposed on, the subsequent layers being stacked on top of the substrate, can improve encapsulation. Manufacture may also be improved and simplified by using this technique. Sensitivity to an object to be sensed may also be improved by disposing the structural layers of the pixel onto the opposing side of the surface to be touched, rather than this surface being provided as a final step as seen in prior art designs. In addition, fabrication of larger area arrays may be facilitated, which via improved encapsulation, can provide improved performance compared to current techniques. The dielectric shield being adjacent the capacitive sensing electrode senses whether an interaction with the surface of the dielectric shield comprising the substrate is being made. Sensitivity to the object to be sensed may be improved by this structure.

Optionally, wherein the dielectric shield provides a substrate on which the layers of the structure are disposed.

The thin film transistor comprising a plurality of layers may optionally be deposited on the capacitive sensing electrode. The layers of the pixel may be thus stacked over one another, the dielectric shield comprising the substrate onto which the layers are deposited.

The dielectric shield optionally comprises a first surface to be touched by the object to be sensed; and wherein the capacitive sensing electrode is disposed on a second surface of the dielectric shield. The dielectric shield has a first or "top" surface that provides a screen-like surface that a user may interact with, and a second or "bottom" surface for detecting and reacting to such an interaction.

Optionally, an insulating layer separates the capacitive sensing electrode from the thin film transistor. The insulating layer between the capacitive sensing electrode and the thin film transistor may act to avoid shorting between the two features, and can provide the insulating layer of the capacitor that forms the capacitive sensing electrode.

The capacitive sensing electrode is optionally connected to the thin film transistor by a conductive via through the insulating layer. The via advantageously provides an electrical connection between the layers of the pixel, in particular it may provide a connection between the capacitive sensing electrode and an element of the thin film transistor.

A source-drain layer of the pixel structure may comprise a source region and a drain region of the thin film transistor. The source-drain layer can be a metalized, conductive layer. The source and drain regions may comprise islands of the deposited metal, and may be simultaneously deposited. Simultaneous deposition maintains that the material of the source-drain layer is constant and aids simplicity of manufacturing. Patterning can be used to ensure the source and drain regions are separate.

The pixel may further comprise a channel region comprising a semiconductor, which connects the source region and the drain region of the thin film transistor in an "on" state. The channel region may be referred to as an active region. In an "off" state, i.e. when there is no current applied to the pixel, the source and drain regions remain ohmically unconnected by virtue of the channel region.

Optionally, the source-drain layer connects to an output of the pixel. This may be a data line or a source line such that the pixel can be addressed.

The pixel structure may further comprise a gate layer of the pixel structure comprising a gate region of the thin film transistor. This may be a second metalized, conductive layer. The gate layer may be separated from the source-drain layer and the channel region by a gate-insulator layer disposed between the gate layer and the channel region. Thus, the TFT may comprise a source-drain region, an active region provided by the channel region, a gate-insulator layer and a gate region.

The gate layer may be disposed between the capacitive sensing electrode and the source-drain layer, for example, in a bottom gate arrangement. Or, the source-drain layer may be disposed between the capacitive sensing electrode and the gate layer in a top gate arrangement. Either arrangement can be used, the difference between the two is the method of manufacture, there is little functional difference between the two configurations.

The conductive via may connect the capacitive sensing electrode to the TFT.

Optionally, the pixel structure may further comprise a reference capacitor. A reference capacitor can be connected in series with the capacitive sensing electrode so that, in response to a control voltage, an indicator voltage is provided at the connection between the reference capacitor and the capacitive sensing electrode to indicate the proximity of the conductive object to be sensed. This arrangement may reduce problems associated with parasitic capacitance which may occur in prior art touch sensors. The reference cap may further enable touch capacitive measurement.

The pixel structure comprising a reference capacitor may be arranged such that at least one of the source-drain layer and the gate layer are arranged to provide a plate of the reference capacitor. To complete the circuitry of an individual pixel, such that it may be individually addressed, the reference capacitor plates can be arranged to be integrated by virtue of simultaneous deposition with the metalized layers of the TFT.

The gate layer may be connected to the capacitive sensing electrode. This beneficially provides circuitry such that a capacitive divider may be integrated to the structure of the pixel. In response to a control voltage, the reference capacitor and the capacitive sensing electrode act as a capacitive potential divider. However, the pixel layers may also be structured whereby the drain region is connected to the capacitive sensing electrode. In this case, there is no capacitance divider.

Optionally, the pixel structure may comprise an input for coupling a bias voltage to a first plate of the reference capacitor for pre charging the pixel.

According to a second aspect there is provided a method of manufacturing a pixel structure comprising a plurality of layers for providing a touch sensitive pixel of a touch sensitive array, the method comprising: depositing a capacitive sensing electrode on a first surface of a dielectric shield, wherein the dielectric shield comprises a second surface, opposite to the first surface, and arranged to be touched by an object to be sensed by the pixel; and fabricating a thin film transistor wherein the thin film transistor is connected to the capacitive sensing electrode.

The thin film transistor may be deposited in a top gate or bottom gate configuration.

The method may further comprise the thin film transistor being fabricated over the capacitive sensing electrode. This can be referred to a field-shield design. As such, the dielectric shield provides the substrate onto which the layers of the pixel are deposited onto.

A passivation layer may be deposited between the capacitive sensing electrode and the thin film transistor. The passivation layer may be an insulating layer than protects the capacitive sensing electrode and thin film transistor for shorting.

The connection between the capacitive sensing electrode and the thin film transistor may comprise a conductive via through the insulating layer. The conductive via may optionally be connected to a drain region of the thin film transistor.

Fabricating the thin film transistor may comprise: depositing a source-drain layer and a gate layer; wherein the source-drain layer comprises a source region of the thin film transistor and a drain region of the thin film transistor; and wherein the gate layer comprises a gate region of the thin film transistor.

The method may also comprise depositing an active layer, for example a channel region, adjacent the source-drain layer and a gate insulator layer deposited between the gate layer and the active layer/source-drain layer combination such that a TFT is manufactured.

Optionally, wherein the source-drain layer further comprises a first plate of a reference capacitor and the gate layer comprises a second plate of a reference capacitor. The source-drain layer may optionally be deposited in the same metal deposition as one of the plates of the reference capacitor. The second plate of the reference capacitor may also be optionally deposited concurrently with the gate region, but may be isolated from the gate region.

In a top gate configuration, the source-drain layer is deposited first (optionally including a reference capacitor plate), followed by the active region, then the gate insulator and finally the gate layer (optionally including the other reference capacitor plate).

Aspects of the present disclosure provide pixel structures. Such pixel structures may find application in a sensor array comprising a plurality of such pixel structures. For example, in an aspect there is provided a sensor array comprising a plurality of touch sensitive pixels, each pixel comprising: a capacitive sensing electrode for accumulating a charge in response to proximity of a conductive object to be sensed; a reference capacitor connected in series with the capacitive sensing electrode so that, in response to a control voltage, an indicator voltage is provided at the connection between the reference capacitor and the capacitive sensing electrode to indicate the proximity of the conductive object to be sensed. This arrangement may reduce or overcome the problem associated with parasitic capacitance which may occur in prior art touch sensors.

Each pixel may comprise a sense VCI (voltage controlled impedance) having a control terminal connected so that the impedance of the sense VCI is controlled by the indicator voltage. Typically the sense VCI comprises at least one TFT (thin film transistor) and the conduction path of the VCI comprises the channel of the TFT. A conduction path of the sense VCI may be connected to a first plate of the reference capacitor, and the control terminal of the first VCI is connected to the second plate of the reference capacitor. At least one plate of the reference capacitor may be provided by a metallisation layer of a thin film structure which provides the sense VCI.

The conduction path of the sense VCI may connect the first plate of the reference capacitor, and so also the control voltage, to an input of a readout circuit. This may enable the circuitry which provides the control voltage also to provide the basis for the output signal of the pixel.

This may further address problems associated with parasitic capacitance and signal to noise ratio in prior art touch sensors. An alternative way to address this same problem is to arrange the conduction path of the sense VCI to connect a reference signal supply to an input of a readout circuit. The reference signal supply may comprise a constant voltage current source. Thus, modulating the impedance of the sense VCI of a pixel controls the current from that pixel to the input of the read-out circuit.

A select VCI may also be included in each pixel. This may be connected so that its conduction path is connected in series between the conduction path of the sense VCI and the reference signal supply. Thus, switching the select VCI into a non-conducting state can isolate the sense VCI from the reference signal input, whereas switching the select VCI into a conducting state can enable current to flow through the pixel (depending on the impedance of the sense VCI). A control terminal of the select VCI may be connected for receiving the control voltage, e.g. from a gate drive circuit.

Each pixel may comprise a gate line VCI, and a conduction path of the gate line VCI may connect the reference signal supply to the first plate of the reference capacitor for providing the control voltage.

Each pixel may comprise a reset circuit for setting the control terminal of the sense VCI to a selected reset voltage. The reset circuit may comprise a reset VCI. A conduction path of the reset VCI is connected between a second plate of the reference capacitor and one of (a) a reset voltage; and (b) a first plate of the reference capacitor. A control terminal of the reset VCI may be connected to another pixel of the sensor for receiving a reset signal (e.g. from a channel of a gate drive circuit which is connected to the control terminal of the select VCI of a pixel in another row of the array). The reset signal may be configured to switch the reset VCI into a conducting state, thereby to connect the second plate of the reference capacitor to the one of (a) the reset voltage and (b) the first plate of the capacitor. Connecting the second plate of the reference capacitor to the one of (a) the reset voltage.

For the avoidance of doubt, the disclosure of this application is intended to be considered as a whole. Any feature of any one of the examples disclosed herein may be combined with any selected features of any of the other examples described herein.

For example, features of methods may be implemented in suitably configured hardware, and the functionality of the specific hardware described herein may be employed in methods which may implement that same functionality using other hardware.

BRIEF DESCRIPTION OF DRAWINGS

Some practical implementations will now be described, by way of example only, with reference to the accompanying drawings in which:

FIG. 2 comprises a plan view of a pixel apparatus comprising a pixel array, and Inset B of FIG. 2 shows an alternative exemplary pixel structure of the pixel array;

FIG. 3 illustrates a representation of the sensor device comprising the pixel array disposed on a substrate in use;

FIG. 4*a* illustrates a top gate coplanar TFT structure;

FIG. 4*b* illustrates a bottom gate coplanar TFT structure;

In the drawings like reference numerals are used to indicate like elements.

SPECIFIC DESCRIPTION

Embodiments of the present disclosure are directed at design and manufacture of the layers of a pixel structure comprised in a touch sensitive surface.

Figure 1:
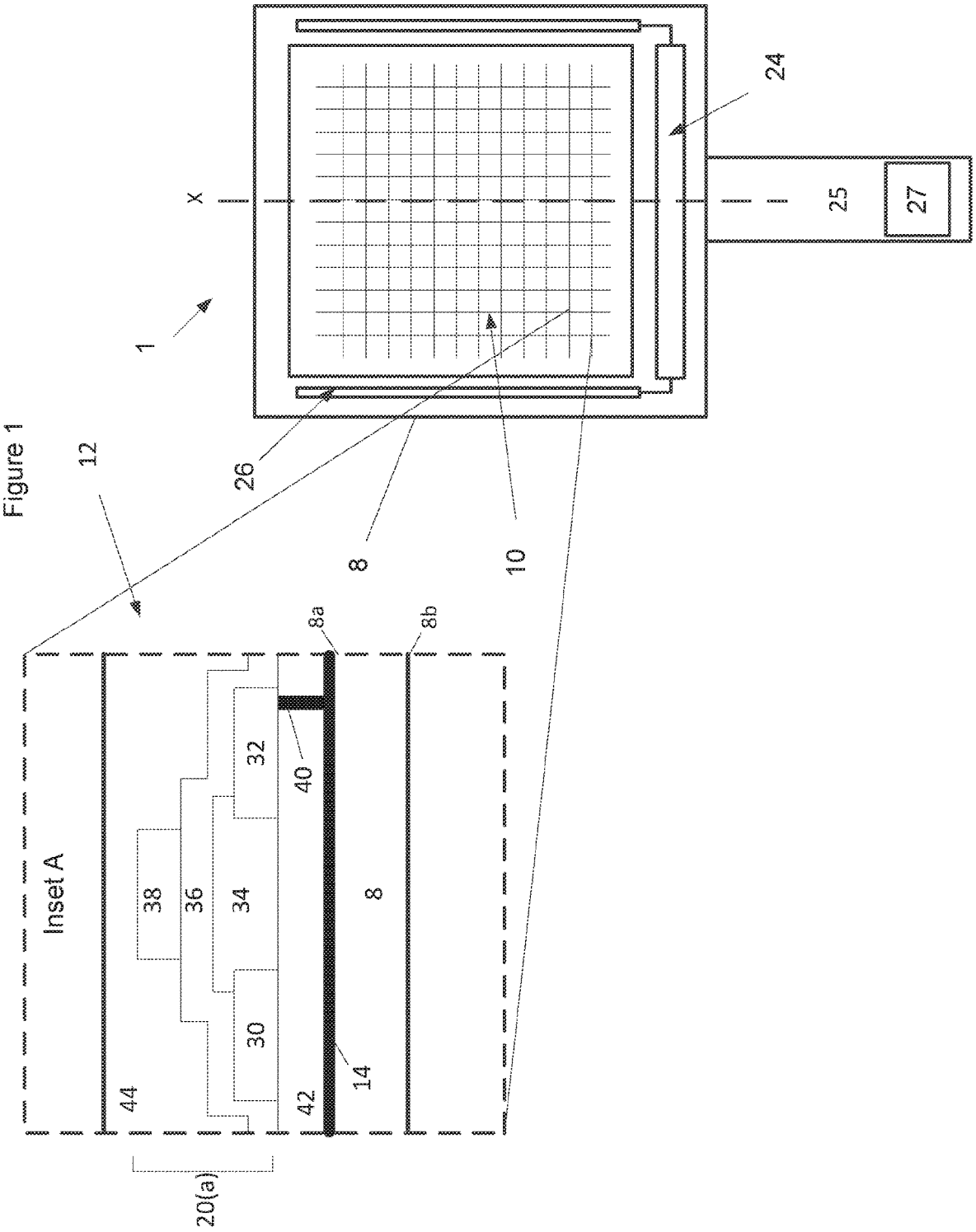
FIG. 1 comprises a plan view of a pixel apparatus comprising a pixel array, and Inset A of FIG. 1 shows an exemplary pixel structure of the pixel array.

FIG. 1 illustrates a sensor apparatus 1 having a sensor array 10 in which the pixel structure 12 of the present disclosure may be incorporated. An exemplary structure of a pixel 12 is shown in a detailed view in Inset A. FIG. 2 shows a similar sensor apparatus 1 comprising an alternative pixel structure 12', which is shown in Inset B. FIGS. 1 and 2 will be described together below.

The pixel array 10 comprises a plurality of touch sensitive pixels 12, 12'. Typically, other than in respect of its position in the array, each pixel 12, 12' is identical to the others in the array 10. As illustrated, each pixel 12, 12' comprises a capacitive sensing electrode 14 for accumulating a charge in response to proximity of the surface of a conductive object to be sensed and a thin film transistor (TFT) 20, the structure of which may be as illustrated in Inset A (top gate) or B (bottom gate) of FIGS. 1 and 2 respectively.

A dielectric shield 8 provides the substrate on which layers of the pixel may be disposed. For example, a capacitive sensing electrode 14 and a TFT 20 may be "stacked" in layers on top of the dielectric shield 8, wherein the dielectric shield 8 is the substrate/carrier.

The pixel array 10 comprises rows and columns of adjacent individual pixels 12, 12'. Individual pixels 12, 12' are capable of being individually addressed. The size of each individual pixel 12, 12' can be between 50 μm×50 μm and 125 μm×125 μm and is typically approximately square. The smaller the pixel area is, the greater the resolution that can be achieved. An example resolution is 500 pixels-per-inch (PPI), but the resolution can be in the range of between 500 PPI and 200 PPI. The resolution is variable and depends on the desired functionality of the array as well as the pixel area.

Typical geometry of the pixels in an array might be: for a resolution of 500 PPI, the pixels having a size of 50 μm×50 μm; for 300 PPI the pixels being 85 μm×85 μm in size; for 250 PPI the pixels being 100 μm×100 μm in size; and for a resolution of 200 PPI the pixels having a size of 125 μm×125 μm.

The structure of each individual pixel 12, 12' stacked on the dielectric shield 8, the dielectric shied having a thickness of less than 100 μm, comprises a capacitive sensing electrode 14 having a thickness between 10 nm and 1 μm, depending on the desired resistance, coupled to a TFT 20 with a thickness of a few hundred nanometers (depending on the precise materials and processes used). The capacitive sensing electrode 14 is disposed between the dielectric shield 8 and TFT 20, and is connected to the TFT 20 by a conductive via 40.

The capacitive sensing electrode 14 may be spaced away from the TFT 20 by an insulating layer 42, for example a passivation layer or dielectric layer, by a distance of between 200-500 nm and 1-2 μm depending on the material and deposition method used. The insulating/passivation layer 42 may comprise an insulator material such as inorganic silicon nitride.

The conductive via 40 is disposed through the passivation layer 42 and/or the gate insulator layer 36 (depending on the TFT 20 configuration) to connect the capacitive sensing electrode 14 to the TFT 20.

A top gate TFT, as shown by 20(a) in FIG. 1 comprises: a first metalized layer comprising, for example, a source region 30, and a drain region 32; an active layer 34 disposed between the regions of the first metal layer; an insulating layer 36, or gate insulator layer, disposed on the active layer 34 and first metal layer; and a second metal layer 38, for example a gate region 38, disposed on and separated from the source 30, drain 32 and active 34 regions by the insulating layer. The first metal layer comprises a source region 30 and a drain region 32, which are separated from one another. The first metal layer is adjacent the active layer 34, for example a channel region 34, which comprises a semiconductor. The active/channel layer is adjacent the gate insulator layer 36, which comprises a dielectric. A second metal layer, adjacent the insulating layer 36 comprises a gate region 38. The structure of the TFT 20 is such that the first and second metal layers are separated by the gate insulator layer 36.

A TFT, as shown in 20(b) in FIG. 2 shows a bottom gate TFT which can be fabricated by an alternative process order comprising: a first metal layer comprising, for example a gate region 38; a gate insulator layer 36 disposed over the gate region 38 such that the gate region is covered by the insulating layer; an active layer 34 disposed over the insulating layer 36; and a second metal layer comprising, for example, a source region 30, and a drain region 32. In both top gate and bottom gate configurations, the source and drain regions comprise metallic islands and are separated such that they are electrically/ohmically isolated in an "off" state. In an "on" state, the active region, comprising a semiconductor, provides a conductive path between the source and drain regions. The insulating layer 36 shields the first metalized layer from the second metalized layer in both top gate and bottom gate configurations.

The TFT 20 may be encapsulated by an additional passivation layer, for example a protective layer, 44 once it has been deposited in the stack on the dielectric shield 8 acting as the substrate.

The source region 30 and drain region 32 are connected by the active layer/channel region 34 comprising a semiconductor. The layer of metal which provides the source and drain regions of the TFT 20 can be referred to as a source-drain layer of the pixel. The source region 30 comprises a conductor and is connected to an input of the pixel. The drain region 32 also comprises a conductive material, and is typically made from the same material as the source region 30 for ease of manufacture. The drain region 32 is connected to an output of the pixel. The channel region, or active region, 34 comprises a thin film semi-conductor which provides a conduction path between the source 30 and drain 32 regions when biased or in an "on" state.

The conductive via 40 may connect the capacitive sensing electrode 14 to the drain region 32 of the TFT 20.

In instances where the insulating/passivation layer 42 is on the thinner end of the range (200-500 nm), the TFT 20 may be a bottom gate TFT (FIG. 2), such that the conductive via 40 passes through both insulating/passivation layer 42 and gate insulator layer 36 (of TFT 20). In instances where the insulating layer 42 is thicker (1-2 μm), the TFT 20 may be a top gate TFT (FIG. 1) such that the conductive via 40 passes only through the insulator layer 42. These arrangements may provide improved performance of the capacitive sensing electrode 14, although it will be appreciated that either can be used.

The spacing distance of the capacitive sensing electrode 14 from the TFT 20 "shields" the electronic circuit (or pixel circuit) from any external interference, for example from a resulting electromagnetic field. The electrode 14 and the spacing together provide the shielding effect.

In addition to each of the pixels 12, 12' in pixel array 10, such a pixel apparatus 1 comprises a gate drive circuit 26, and a read out circuit 24. The gate drive circuit 26 and the read out circuit 24 are connected to the TFT 20 of the pixel 12, 12' via gate lines (rows) and source/data lines (columns) of the same conductive material as the source, drain and gate regions, such that a pixel can be individually addressed.

A connector 25 for connection to a host device may also be included. The connector 25 carries a host interface 27, such as a plug or socket, for example a flexfoil with a connector, for connecting the conductive lines in the connector to signal channels of a host device in which the pixel apparatus 1 is to be included.

The host interface 27 is connected by the connector 25 to the read out circuit 24. A controller is connected to the gate drive circuit 26 for operating the pixel array, and to the read out circuit 24 for obtaining signals indicative of self-capacitance measured by pixels of the pixel array 10.

Each pixel 12, 12' can be individually addressed by virtue of the gate drive circuit 26, which comprises a plurality of gate drive channels and is configured to activate the gate drive channels in sequence. The connector 25 is provided by a multi-channel connector having a plurality of conductive lines. This can be flexible, and may comprise a connector such as a flexi, or flexi-rigid PCB, a ribbon cable or similar.

The plurality of layers of the pixel 12, 12' are disposed on the substrate, for example the dielectric shield 8, using a plurality of techniques described later. The capacitive sensing electrode 14 and the TFT 20 being disposed on the dielectric shield 8 may improve encapsulation and may increase sensitivity to the object to be sensed, as well as performance of the pixel compared to previous pixels, whereby the dielectric shield does not provide the substrate. By disposing the layers of the pixel 12 onto the carrier substrate, the carrier substrate being the dielectric shield 8, encapsulation may be improved. The method of manufacture of the pixel 12, 12' can also simplified, in particular for large-area arrays.

The TFT 20 layers of the pixel can also be deposited onto the substrate, wherein the capacitive sensing electrode 14 is disposed between the TFT 20 and the dielectric shield 8. Beneficially, the manufacturing process can be further simplified using this technique and pixel performance may be further enhanced by improving alignment, for example, as well as mechanical, thermal, UV-light sensitivity and electromagnetic field protection.

The combined elements of the sensor apparatus work to sense an interaction with the pixel array 10 at one or more pixels 12, 12'.

The pixel array 10 disposed on the dielectric shield 8 in the sensor apparatus 1 provides a sensor, for example an active area defined by the pixels 12, 12', to be touched by an object 50 to be sensed. The capacitive sensing electrode 14 is adjacent to the first surface 8a of the dielectric shield 8. A change of capacitance in the capacitive sensing electrode 14 occurs when the second surface 8b of the dielectric shield 8 is touched or an object 50 is sensed. Depositing the capacitive sensing electrode 14 adjacent to the first surface 8a of the dielectric shield may advantageously provide greater sensitivity to the object 50 to be sensed. Sensing the object 50 comprises determining a change in capacitance of a pixel 12, 12' (or pixels) in the pixel array 10.

The pixels 12, 12' can be arranged in a grid, for example a matrix, construction and are typically arranged linearly to simplify manufacturing. Linear arrangements in particular provides ease of manufacture when scaling up the array size, although the pixel array 10 is not limited to such a configuration. An image, for example a fingerprint image, may be built up by the same configuration of pixels.

Pixels may be addressed by a passive matrix, active matrix or multiplexing system, which can depend on physical aspects, such as device size, or for example the purpose of the sensing apparatus. Where fingerprint sensing is the main purpose, configurations comprising active matrix addressing may be preferable and multiplexing may provide better performance for, in particular, larger arrays.

The pixel array 10 dimensions range from 1 cm×1 cm to 100 cm×100 cm, preferably wherein the array is between 3.2 cm×2.4 cm and 50 cm×50 cm, more preferably wherein the array is between 6.4 cm×4.8 cm and 13 cm×8 cm. The pixel array 10 is not limited to being in a square or rectangular configuration and may take any shape, the dimensions are adjusted depending on the desired active area depending on the intended use of the pixel apparatus 1.

Optionally, each pixel 12, 12' in the array 10 may also comprise a reference capacitor. The reference capacitor may have a first plate connected to one of the metalized layers (i.e. the source-drain layer of the TFT 20) and a second plate. The second plate, for example a separate metal island, may be made from the same material as, and in line with, the metal gate 38 whilst being electrically unconnected to the gate 38 and separated from the first plate by the insulator layer 36. The reference capacitor may be deposited simultaneously with the metalized and insulator layers of the TFT 20 for ease of manufacture. The reference capacitor may help to reduce the influence of parasitic capacitance in the pixel array 10 and may also enable touch capacitance measurement.

FIG. 3 illustrates a possible interaction between an object 50 to be sensed and the pixel apparatus 1. The pixel apparatus 1 in FIG. 3 has been rotated about the axis X labelled in FIGS. 1 and 2. The sensor apparatus is configured with the pixel array 10 of FIGS. 1 and 2 disposed on the surface 8a.

The object to be sensed 50 may come into contact with a top surface 8b comprising a dielectric shield 8. The sensor apparatus 1, and in particular the pixel array 10, may be disposed on the opposite (or bottom) surface of the dielectric shield 8a to the surface to be touched.

A pixel 12, 12' in the exemplary configuration of FIG. 3, although it is not illustrated, comprises the capacitive sensing electrode 14 disposed on the first surface 8a of the dielectric shield 8, between the object to be sensed 50 and the TFT 20 of the pixel 12, 12'.

In fabricating the pixel apparatus 1, the dielectric shield 8 may be the substrate onto which the pixels 12, 12' in the pixel array 10 and the other components, such as the read out circuit 24 and the drive circuit 26 are disposed. The dielectric shield is planar; having two surfaces. The first surface 8a of the dielectric shield 8 is the surface on which the layers of the pixel array 10, including each individual pixel 12, 12' are disposed. The second surface 8b of the dielectric shield 8 is a surface to be touched by an object to be sensed. The object may be a finger, for example, as shown in FIG. 3.

The pixel array 10 disposed on the dielectric shield 8 provides a surface to be touched and is, for example, one or more of: a screen, a dedicated segment of a screen, or an integrated area of a device. A typical device having the pixel apparatus might be a phone, laptop, TV or computer screen, or part of a touch sensitive security panel that may be used as a key to gain entry, for example, through a door. As technology develops, more and more surfaces are becoming interactive. The pixel array 10 can be integrated on any such device by virtue of the flexibility in the dimensions of the array. If the dielectric shield is thin and flexible, the sensing apparatus can also be shaped.

The second surface 8b of the dielectric shield 8 may not have to be touched by an object in order to be sensed; a gesture or touch action may be sufficient to detect a signal.

FIG. 4a illustrates a coplanar arrangement of a top gate TFT 20(c) and FIG. 4b illustrates a coplanar bottom gate TFT 20(d). The structure of the TFTs will be described in more detail below, also in relation to the TFTs 20(a) and 20(b) as illustrated in FIGS. 1 and 2. The specific orientation and geometry of the TFT 20(a-d) does not affect the performance of the pixel 12, 12' and may be any one of the illustrated configurations.

The source 30, drain 32 and channel 34 regions can be coplanar or staggered. FIGS. 1 and 2 show a staggered top gate TFT 20(a) and bottom gate TFT 20(b) respectively, whilst FIGS. 4a and 4b illustrate coplanar arrangements.

A staggered top gate TFT 20(*a*) (FIG. 1) and a coplanar top gate TFT 20(*c*) (FIG. 4*a*) comprise the gate region 38, or gate layer, disposed on top of the source-drain layer 30, 32, the active channel region 34, and the gate insulator layer 36. A staggered bottom gate TFT 20(*b*) (FIG. 2) or a coplanar bottom gate TFT 20(*d*) (FIG. 4*b*) comprises the source-drain layer disposed on top of the gate layer 38, the gate insulator 36 and the active channel region 34. The difference between coplanar and staggered arrangements is the method of manufacture; there is no functional difference.

Either a top gate TFT, bottom gate TFT, coplanar or staggered structure, can be used in combination with the capacitive sensing electrode 14 disposed on the dielectric shield 8 in each pixel 12, 12'. However, in a pixel array 10, a single TFT arrangement is present, with each individual pixel 12, 12' within the array being identical in structure to the other pixels in the array. The dielectric layer 36, also known as a gate insulator layer, is between the gate layer and the source-drain layer in both arrangements.

Figure 5:
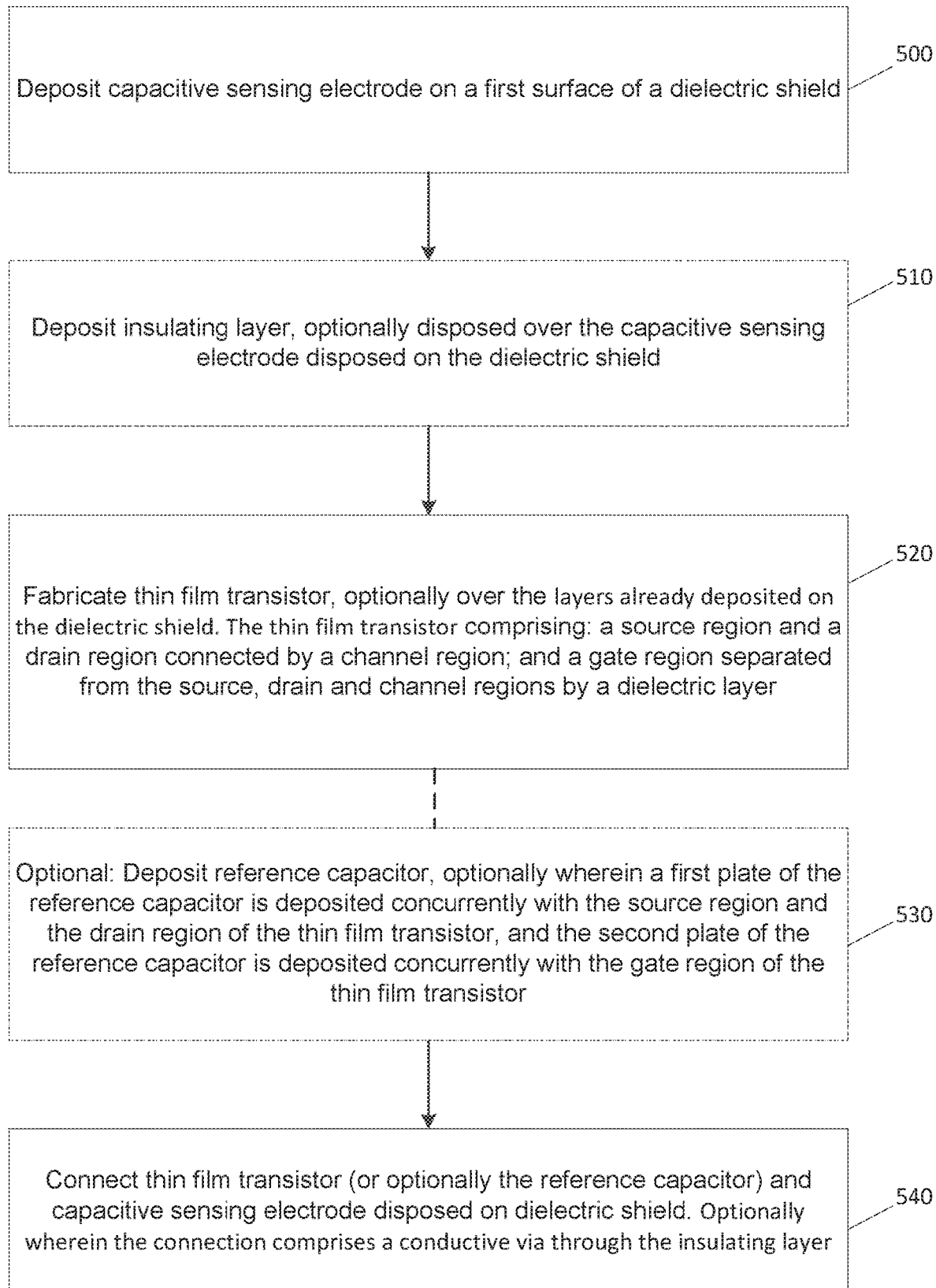
FIG. 5 illustrates an exemplary method of manufacture of a pixel array.

FIG. 5 illustrates method steps that are taken to fabricate a pixel 12 for the pixel apparatus 1.

Techniques used to deposit the layers comprise chemical vapour deposition (CVD), plasma enhanced CVD (PECVD), sputtering, spin coating, spray techniques, ink jet or flexo printing, patch coating, wet and/or dry etching, atomic layer deposition, or lithography techniques. It will be appreciated that other deposition methods may be used to deposit the layers onto the surface of the substrate, and that one or more of the techniques might be used in any combination.

In step 500, the capacitive sensing electrode 14 is deposited on a first surface 8*a* of the dielectric shield 8.

The dielectric shield 8 that provides the support of the pixel apparatus 1 comprises an insulator having a high epsilon value such as glass (sodalime, bora-silicate, quarts/SiO2) but may also comprise a flexible substrate material such as flex-foil sheets and/or flex-foil substrates (Poly Imide (PI), PET, PEN, or other suitable polymers, or metal foils/plates with insulator coatings, etc.). Other appropriate insulating, and optionally transparent materials can also be used as the substrate. In addition, the material can be mechanically grinded and/or chemically etched to desired thickness. The thickness is preferably less than 100 μm.

The capacitive sensing electrode 14 comprises a dielectric layer disposed between two electrodes. The electrodes comprise a conductive material such as indium tin oxide or fluorine tin oxide, or another material that has high transparency; if transparency of the capacitive sensing electrode 14 is a desired quality of the pixel apparatus 1. Other possible materials include copper, printed inks or other standard metal layers including: Al, an Al-alloy (e.g. AlNd), ITO, Moly, etc.

Step 510 is a step in which an insulating/passivation layer is deposited. The insulating layer is deposited over the capacitive sensing electrode and comprises a material such as inorganic silicon nitride.

In step 520, a TFT 20 is fabricated. The TFT 20 can be fabricated over the insulating layer deposited in step 510.

The source 30, drain 32 and gate 28 regions are typically metallic, such as Al, AlNd or Mo, and can be made to be transparent by using indium tin oxide, for example. The channel region comprises a semiconductor material such as amorphous/microcrystalline silicon/polysilicon, cadmium selenide, zinc oxide or hafnium oxide or another suitable metal oxide and may have a thickness of a few hundred nanometers depending on the material used and the process used to deposit it. Organic materials may also be used.

Methods of manufacture of a TFT 20 comprises any of: sputtering, spin coating, spray techniques, inkjet printing, etching or CVD in particular PECVD which allows lower operating temperatures. Other methods such as lithography techniques may also be used. It will be appreciated that there are a number of techniques and methods that can used to fabricate a TFT 20. There are also a number of different structures that can be fabricated.

TFTs are fabricated on a substrate, which may typically be insulating, for example, the dielectric shield 8, electrode layer 14 and the insulator 42. The layers are deposited using a number of techniques as described above. Main components of a TFT 20 comprise: a dielectric; a channel region/semiconductor layer; and source, drain and gate regions, which act as electrodes. The source and drain regions contact the channel region and are connected by it in an "on" state. The gate region is separated from the source, drain and gate regions by a gate insulator layer.

Fabricating a staggered top gate TFT 20(*a*) as illustrated in FIG. 1 will be described herein below. A similar process comprising the steps in a different order is used in fabricating a bottom gate TFT. Coplanar arrangements can also be fabricated using the below described steps.

A first step comprises depositing the source-drain layer by depositing a conductor material. The source-drain layer comprises a source region and a drain region, which are conducting and act as electrodes. A degree of patterning may be required to deposit the source and drain regions in the desired locations with the desired geometry and dimensions over the channel region. Channel length L, which separates the source region 30 from the drain region 32, varies from 2-3 μm to 10 μm. Channel width W varies from 2-3 μm up to larger values of up to between 10 μm and 50 μm or more. The W/L ratio determines the electrical behaviour.

A second step comprises depositing a channel region in a channel layer of the TFT 20. The channel region comprises a semi-conductor material, and fills the channel region L, W between the source and drain regions of the first metalized layer. The channel region may be deposited in a homogeneous, planar deposition, with a thickness of a few hundred nanometers.

A third step comprises depositing a gate insulator layer. The gate insulator layer separates the gate region from the source, drain and channel regions. The gate insulator layer may be deposited by a homogeneous planar deposition across the array area, with a thickness of a few hundred nanometers.

A fourth step comprises depositing a gate region made from a conductive material. A degree of patterning may be required to deposit the gate region in the desired location with the desired geometry and dimensions over the gate insulator layer. The gate region needs to cover the above mentioned channel L and W. So may typically be slightly larger than these dimensions by a couple of micrometers.

A final step comprises depositing an insulating coating 44, for example a protective layer or shield, over the TFT layers to encapsulate and protect them. This coating may be made using a glob top encapsulating material, and may be quite thick so processes such as spin coating may be appropriate.

Step 530 is an optional step, which may be performed in parallel with step 520. A reference capacitor comprising a first and a second plate is deposited. The first and second plates of the reference capacitor may be connected to the drain region 32 of the TFT 20 and a common electrode, $W_{com}$, comprising a metal island in line with the gate region 38, and may be deposited simultaneously with the metalized layers of the TFT 20. When deposited simultaneously, the first plate is deposited concurrently with the source 30 and drain 32 regions of the TFT 20 and the second plate is deposited concurrently with the gate region 38.

Advantageously, by depositing the plates of the reference capacitor concurrently with the TFT 20, the total number of manufacturing steps of the pixel may be reduced, beneficially decreasing fabrication time. The accuracy and performance of the resulting pixel may also be improved, for example, by improvements in alignment and connectivity.

In step 540, the capacitive sensing electrode 14 deposited on the dielectric shield 8 is coupled to the TFT 20. A conductive via 40 is fabricated and connects the capacitive sensing electrode 14 to the TFT 20. Fabrication of the conductive via 40 is integrated with steps 520 and 530 above and depends on whether the TFT is a top gate or bottom gate TFT. After deposition of insulating layer 42 (FIG. 1—top gate configuration) or gate insulator layer 36 (FIG. 2—bottom gate configuration), a hole is made in the respective layer(s) via lithography. During deposition of the metalized source-drain layer 30/32, the hole is filled with the same metal as the metalized layer and connects the capacitive sensing electrode 14 to the drain region 32.

Techniques such as lithography or wet etching can be used to create a passage for the via 40, into which the conductive material may be deposited. Via material is typically the same as the metal as used for the source-drain layer 30/32. The conductive via 40 is typically made concurrently with the fabrication of the plurality of layers of the pixel.

It will be appreciated that it may be possible to alternatively fabricate the TFT 20 separately from the capacitive sensing electrode 14 disposed on the dielectric shield 8 and connect the two in an additional step. However, making an electrical connection, for example by connecting the via 40 between the TFT 20 and the capacitive sensing electrode 14, may be difficult to achieve when using this alternative process.

Figure 6:
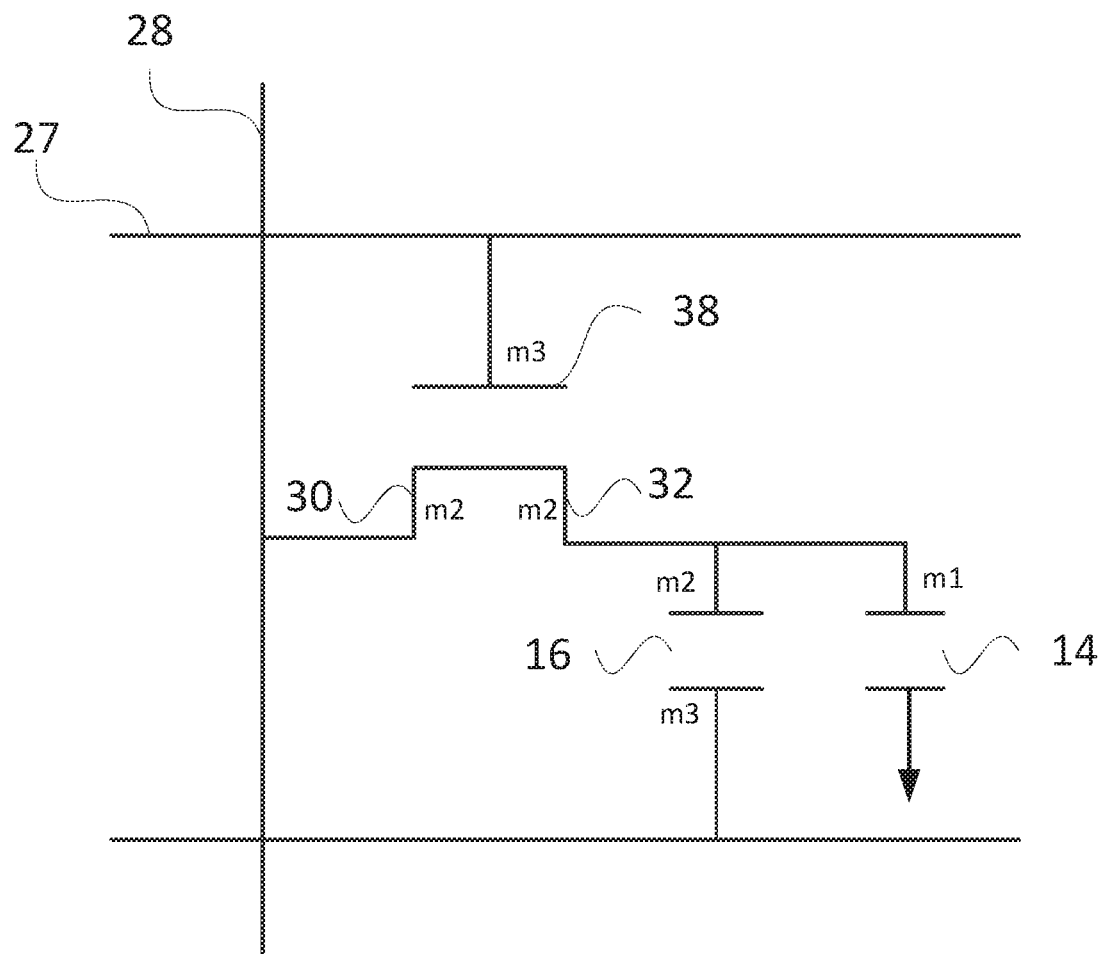
FIG. 6 illustrates a pixel circuit diagram of a top gate structure of a pixel in a pixel array.

FIG. 6 illustrates a pixel circuit, which can be formed from the above described structure and deposition methods. The circuit comprises a TFT 30, 32, 38, a reference capacitor 16 and a capacitive sensing electrode 14 and is addressed by a gate line 27 and a source-data line 28 and outputs to a common line, for example a $W_{com}$ connection. The TFT comprises a source region 30, a drain region 32 and a gate region 38.

The pixel structure described above comprises three conductive layers which may be provided by metallisation layers, such as those deposited in the above method. The first metallisation layer, m1, for example the layer deposited on the carrier substrate (the dielectric shield 8), provides the capacitive sensing electrode 14. A second metallisation layer, m2, in a top gate arrangement (see FIG. 1, Inset A), provides the source 30 and drain 32 region of the TFT 20. One of the plates of the reference capacitor 16 is also provided by the second metallisation layer and can further be connected to the drain region 32, which may also be provided by that same metallisation layer. The third metallisation layer, m3, comprises the gate electrode 38. A second plate of the reference capacitor 16 may also be provided by the third metallisation layer, although it may be separated from the gate region 38 as it is in FIG. 6, for example by patterning (for example by lithography or etching) during manufacture. In a bottom gate configuration (see FIG. 2, Inset B), the second and third metallisation layers are reversed. The conductive via 40 provides an electrical connection between the capacitive sensing electrode 14 and the drain region 32 of the TFT 20, as can be seen in FIG. 6.

As illustrated in FIG. 6, the deposited metal layers denoted as m1, m2 and m3 adjacent the features of the circuit in FIG. 6 can be connected to form the circuit. The illustrated circuit components if the circuit diagram in FIG. 6 depicts both top gate and bottom gate arrangements. A top gate configuration is illustrated in FIG. 6; it will be appreciated that m2 and m3 can be swapped in order to correspond to a bottom gate configuration.

It will be appreciated that the disclosure, as a whole, may be used to provide pixel circuits such as that described with reference to FIG. 6. It will however also be appreciated in the context of the present disclosure that other circuits may also be used, whereby the layers of the pixel are connected in a different manner such that a different circuit is made. The fundamental layers and the method of deposition methods would remain substantially consistent with the above disclosed embodiments. Advantages achieved by using the surface to be touched in a touch sensor also as the substrate for deposition of the pixel stack may of course be provided in other pixel circuits.

Figure 7:
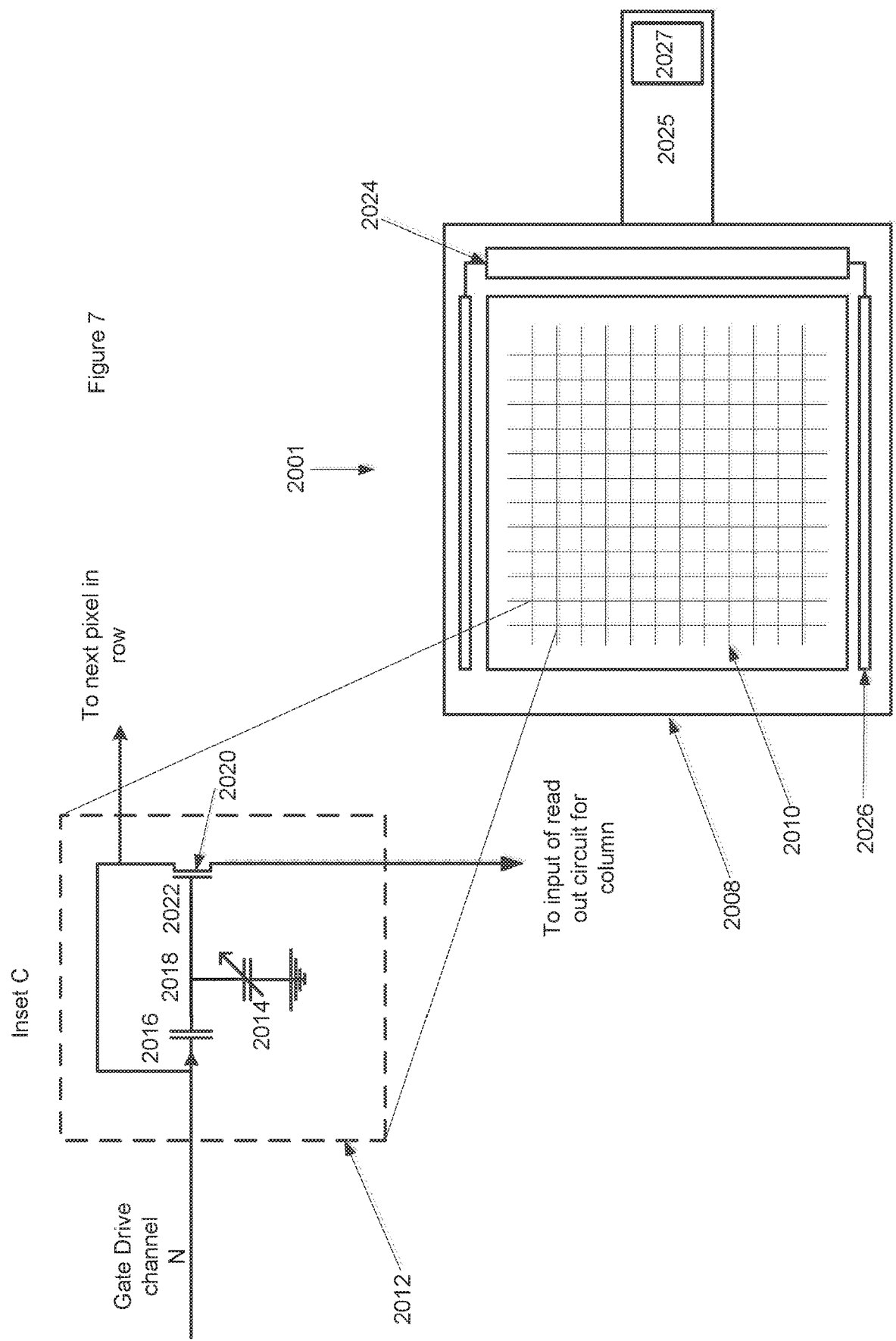
FIG. 7 comprises a plan view of a sensor apparatus comprising a sensor array, and Inset C of FIG. 7 shows a circuit diagram for a pixel of the sensor array.
Figure 8:
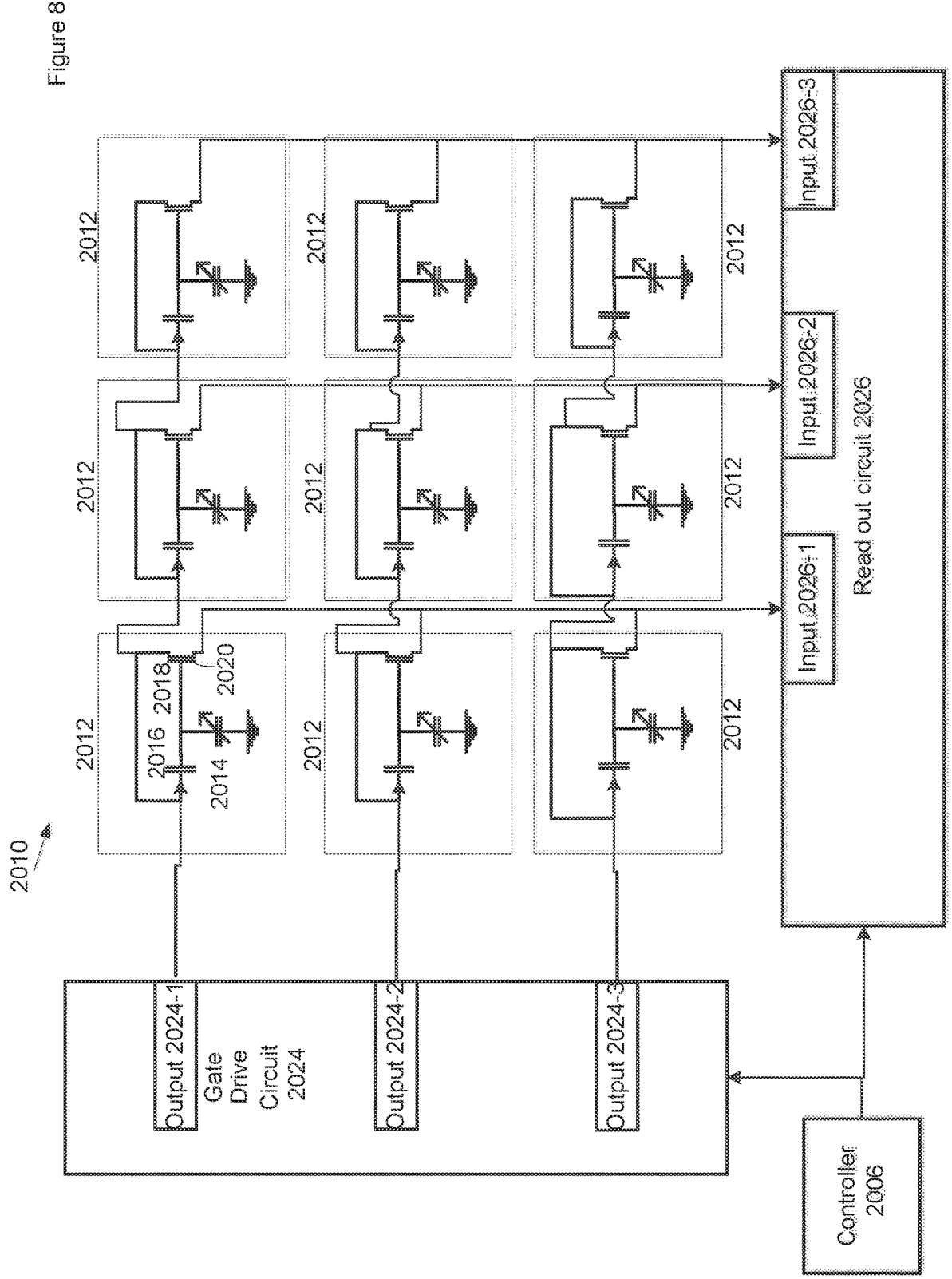
FIG. 8 shows a circuit diagram of a sensor array for a sensor apparatus such as that illustrated in FIG. 7.

Pixel structures of the present disclosure may find application is a sensor array (e.g. as described above). Figure FIG. 7 shows a sensor apparatus 2001 in which the sensor array 2010 of the present disclosure may be incorporated. FIG. 8 illustrates a circuit diagram of one such sensor array 2010. The description which follows shall refer to FIG. 7 and FIG. 8 together. It can be seen from an inspection of FIG. 7 and FIG. 8 that inset C of FIG. 7 shows a detailed view of one pixel of this array 2010.

The sensor array 2010 comprises a plurality of touch sensitive pixels 2012. Typically, other than in respect of its position in the array, each pixel 2012 is identical to the others in the array 2010. As illustrated, each pixel 2012 comprises a capacitive sensing electrode 2014 for accumulating a charge in response to proximity of the surface of a conductive object to be sensed. A reference capacitor 2016 is connected between the capacitive sensing electrode 2014 and a connection to a gate drive channel 2024-1 of a gate drive circuit 2024. Thus, a first plate of the reference capacitor 2016 is connected to the gate drive channel 2024-1, and a second plate of the reference capacitor 2016 is connected to the capacitive sensing electrode 2014.

Each pixel 2012 may also comprise a sense VCI (voltage controlled impedance) 2020 having a conduction path, and a control terminal (2022; inset C, FIG. 7) for controlling the impedance of the conduction path. The conduction path of the sense VCI 2020 may connect the gate drive channel 2024-1 to an output of the pixel 2012. The control terminal 2022 of the VCI is connected to the capacitive sensing electrode 2014 and to the second plate of the reference capacitor 2016. Thus, in response to a control voltage applied by the gate drive channel 2024-1, the reference capacitor 2016 and the capacitive sensing electrode 2014 act as a capacitive potential divider.

The capacitance of the capacitive sensing electrode 2014 depends on the proximity, to the capacitive sensing electrode 2014, of a conductive surface of an object to be sensed. Thus, when a control voltage is applied to the first plate of the reference capacitor 2016, the relative division of that voltage between that sensing electrode 2014 and the reference capacitor 2016 provides an indication of the proximity of the surface of that conductive object to the capacitive sensing electrode 2014. This division of the control voltage provides an indicator voltage at the connection 2018 between the reference capacitor 2016 and the capacitive sensing electrode 2014. This indicator voltage can be applied to the control terminal 2022 of the sense VCI 2020 to provide an output from the pixel 2012 which indicates proximity of the conductive object.

Pixels may be positioned sufficiently close together so as to be able to resolve contours of the skin such as those associated with epidermal ridges, for example those present in a fingerprint, palmprint or other identifying surface of the body. It will be appreciated in the context of the present disclosure that contours of the skin may comprise ridges, and valleys between those ridges. During touch sensing, the ridges may be relatively closer to a sensing electrode than the "valleys" between those ridges. Accordingly, the capacitance of a sensing electrode adjacent a ridge will be higher than that of a sensing electrode which is adjacent a valley. The description which follows explains how systems can be provided in which sensors of sufficiently high resolution to perform fingerprint and other biometric touch sensing may be provided over larger areas than has previously been possible.

As shown in FIG. 7 and FIG. 8 in addition to the sensor array 2010, such a sensor may also comprise a dielectric shield 2008, a gate drive circuit 2024, and a read out circuit 2026. A connector 2025 for connection to a host device may also be included. This may be provided by a multi-channel connector having a plurality of conductive lines. This may be flexible, and may comprise a connector such as a flexi, or flexi-rigid PCB, a ribbon cable or similar. The connector 2025 may carry a host interface 2027, such as a plug or socket, for connecting the conductive lines in the connector to signal channels of a host device in which the sensor apparatus 2001 is to be included.

The host interface 2027 is connected by the connector 2025 to the read-out circuit 2026. A controller (2006; FIG. 8) may be connected to the gate drive circuit 2024 for operating the sensor array, and to the read-out circuit 2026 for obtaining signals indicative of the self-capacitance of pixels of the sensor array 2010.

The dielectric shield 2008 is generally in the form of a sheet of an insulating material which may be transparent and flexible such as a polymer or glass. The dielectric shield 2008 may be flexible, and may be curved. An 'active area' of this shield overlies the sensor array 2010. In some embodiments, the VCIs and other pixel components are carried on a separate substrate, and the shield 2008 overlies these components on their substrate. In other embodiments the shield 2008 provides the substrate for these components.

The sensor array 2010 may take any one of the variety of forms discussed herein. Different pixel designs may be used, typically however the pixels 2012 comprise at least a capacitive sensing electrode 2014, a reference capacitor 2016, and at least a sense VCI 2020.

The array illustrated in FIG. 8 comprises a plurality of rows of pixels such as those illustrated in FIG. 7. Also shown in FIG. 8 is the gate drive circuit 2024, the read out circuit 2026, and a controller 2006. The controller 2006 is configured to provide a clock signal, e.g. a periodic trigger, to the gate drive circuit 2024, and to the read-out circuit 2026.

The gate drive circuit 2024 comprises a plurality of gate drive channels 2024-1, 2024-2, 2024-3, which it is operable to control separately, e.g. independently. Each such gate drive channel 2024-1, 2024-2, 2024-3 comprises a voltage source arranged to provide a control voltage output. And each channel 2024-1 is connected to a corresponding row of pixels 2012 of the sensor array 2010. In the arrangement shown in FIG. 8 each gate drive channel 2024-1, 2024-2, 2024-3 is connected to the first plate of the reference capacitor 2016 in each pixel 2012 of its row of the sensor array 2010. During each clock cycle, the gate drive circuit 2024 is configured to activate one of the gate drive channels 2024-1, 2024-2, 2024-3 by applying a gate drive pulse to those pixels. Thus, over a series of cycles the channels (and hence the rows) are activated in sequence, and move from one step in this sequence to the next in response to the clock cycle from the controller 2006.

The read-out circuit 2026 comprises a plurality of input channels 2026-1, 2026-2, 2026-3. Each input channel 2026-1, 2026-2, 2026-3 is connected to a corresponding column of pixels 2012 in the sensor array 2010. To provide these connections, the conduction path of the sense VCI 2020 in each pixel 2012 is connected to the input channel 2026-1 for the column.

Each input channel 2026-1, 2026-2, 2026-3 of the read out circuit 2026 may comprise an analogue front end (AFE) and an analogue-to-digital converter (ADC) for obtaining a digital signal from the column connected to that input channel 2026-1. For example it may integrate the current applied to the input channel during the gate pulse to provide a measure of the current passed through the sense VCI 2020 of the active pixel 2012 in that column. The read out circuit 2026 may convert this signal to digital data using the ADC. Furthermore, the analogue front end performs impedance matching, signal filtering and other signal conditioning and may also provide a virtual reference.

In the sensor array 2010 shown in FIG. 8, the conduction channel of the sense VCI 2020 in each pixel connects the input channel of the read out circuit for that column to the gate drive channel for the pixel's row. In FIG. 8, the gate drive channel for the row thus provides a reference input. Operation of the sense VCI 2020 modulates this reference input to provide the pixel output. This output signal from a pixel indicates the charge stored on the capacitive sensing electrode 2014 in response to that reference input relative to that stored on the reference capacitor.

FIG. 7 includes a grid as a very schematic illustration of the rows and columns of pixels 2012 which make up the array. Typically this will be a rectilinear grid, and typically the rows and columns will be evenly spaced. For example the pixels may be square. It will of course be appreciated that the grid shown in FIG. 7 is not to scale. Typically the sensor array has a pixel spacing of at least 200 dots per inch, dpi (78 dots per cm). The pixel spacing may be at least 300 dpi (118 dots per cm), for example at least 500 dpi (196 dots per cm).

Operation of the sensor array 2010 of FIG. 8 will now be described.

On each cycle of operation, the gate drive circuit 2024 and the read out circuit 2026 each receive a clock signal from the controller 2006.

In response to this clock signal, the gate drive circuit operates one of the gate drive channels to apply a control voltage to one of the rows of the array. In each pixel in the row, the control voltage from the gate drive channel is applied to the series connection of the reference capacitor 2016 and the capacitive sensing electrode 2014. The voltage at the connection 2018 between the two provides an indicator voltage indicating the proximity of a conductive surface of an object to be sensed to the capacitive sensing electrode 2014. This indicator voltage may be applied to the control terminal of the sense VCI 2020 to control the impedance of the conduction path of the sense VCI 2020. A current is thus provided through the conduction path of the sense VCI 2020 from the gate drive to the input channel for the pixel's column. This current is determined by the gate drive voltage, and by the impedance of the conduction channel.

In response to the same clock signal, the read-out circuit 2026 senses the pixel output signal at each input channel. This may be done by integrating the current received at each input of the read-out circuit 2026 over the time period of the gate pulse. The signal at each input channel, such as a voltage obtained by integrating the current from the corresponding column of the array, may be digitised (e.g. using an ADC). Thus, for each gate pulse, the read-out circuit 2026 obtains a set of digital signals, each signal corresponding to a column of the active row during that gate pulse. So the set of signals together represent the active row as a whole, and the output from each pixel being indicative of the charge stored on and/or the self-capacitance of the capacitive sensing electrode 2014 in that pixel.

Following this same process, each of the gate-drive channels is activated in sequence. This drives the sense VCI 2020 of each pixel connected to that channel into a conducting state for a selected time (typically the duration of one gate pulse). By activating the rows of the array in sequence the read out circuit, can scan the sensor array row-wise. Other pixel designs, other scan sequences, and other types of sensor array, may be used.

Figure 9:
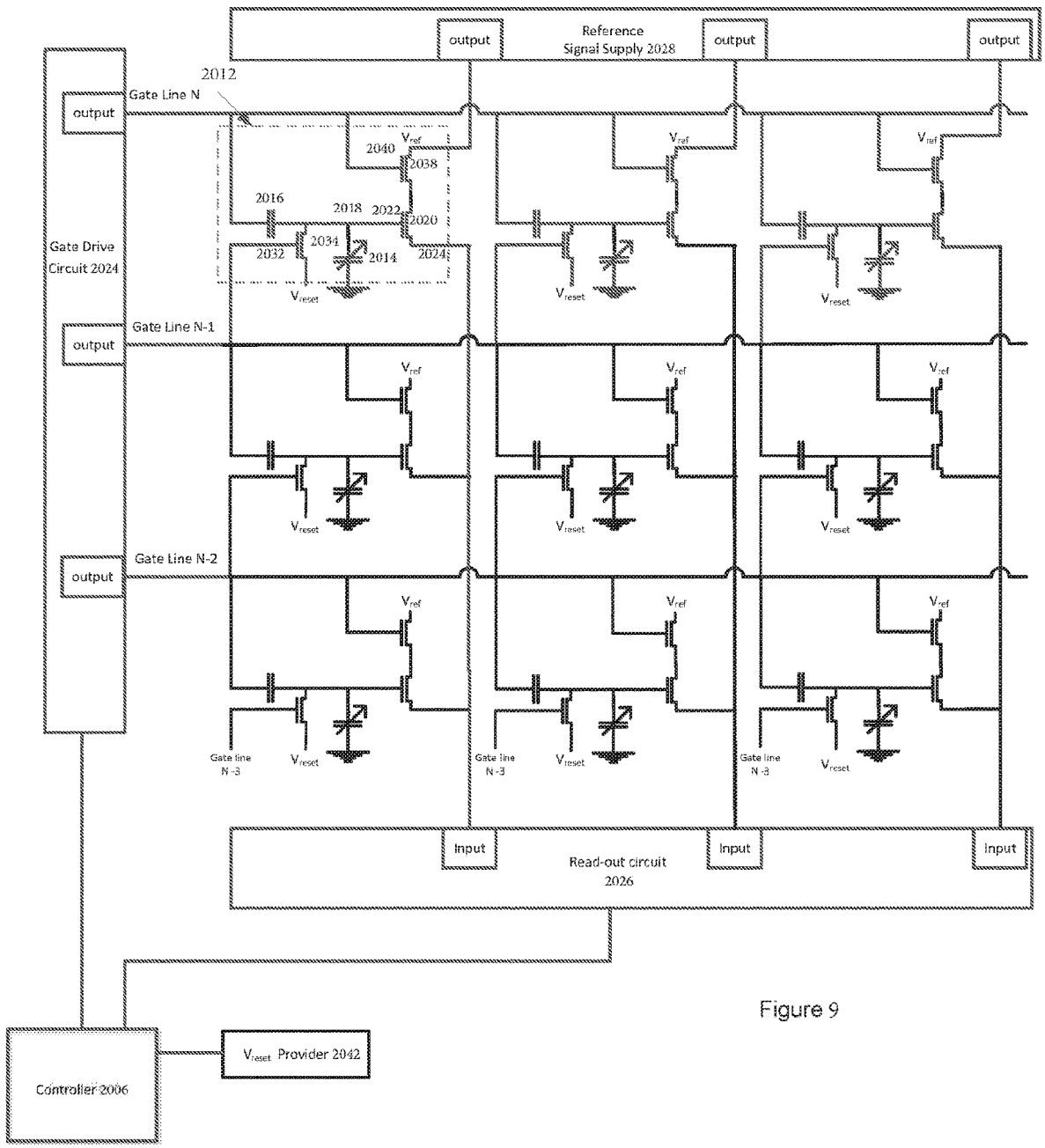
FIG. 9 shows a circuit diagram of another sensor array of the type shown in FIG. 7.

FIG. 9 illustrates another sensor array which may be used in the apparatus illustrated in FIG. 7.

FIG. 9 shows a sensor array 2010 comprising a plurality of pixels, and a reference signal supply 2028 for supplying a reference signal to the pixels. This can avoid the need for the gate drive power supply also to provide the current necessary for the read-out signal.

Also shown in FIG. 9 is the gate drive circuit 2024, the read-out circuit 2026, and the controller 2006.

The sensor array 2010 may also benefit from the inclusion of a reset circuit 2032, 2034 in each pixel. This may allow the control terminal 2022 of the pixel to be pre-charged to a selected reset voltage whilst the pixel is inactive (e.g. while another row of the array is being activated by the application of a gate pulse to another, different, row of the array).

In these embodiments the sensor may also comprise a reset voltage provider 2042 for providing a reset voltage to each of the pixels 2012 of the array as described below. The reset voltage provider 2042 may comprise voltage source circuitry, which may be configured to provide a controllable voltage, and may be connected to the controller 2006 to enable the controller 2006 to adjust and fix the reset voltage.

The reset voltage may be selected to tune the sensitivity of the pixel. In particular, the output current of the sense VCI 2020 typically has a characteristic dependence on the indicator voltage at the control terminal 2022 and its switch-on voltage. Thus the reset voltage may be chosen based on the switch-on voltage of the sense VCI 2020. The characteristic may also comprise a linear region in which it may be preferable to operate.

The pixels illustrated in FIG. 9 are similar to those illustrated in FIG. 7 and FIG. 8 in that each comprise a capacitive sensing electrode 2014, and a reference capacitor 2016 connected with a capacitive sensing electrode 2014. The connection between these two capacitances provides an indicator voltage, which can for example be connected to the control terminal 2022 of a sense VCI 2020. In addition, the pixels of the sensor array illustrated in FIG. 9 also comprise a further two VCIs 2034, 2038, and a connection to the reset voltage provider 2042, and a connection to the reference signal supply 2028.

As noted above, the sense VCI 2020 is arranged substantially as described above with reference to FIG. 7, in that its control terminal 2022 is connected to the connection between the reference capacitor 2016 and the capacitive sensing electrode 2014. However, the conduction path of the sense VCI 2020 is connected differently in FIG. 9 than in FIG. 7. In particular, the conduction channel of the select VCI 2038 connects the conduction channel of the sense VCI 2020 to the reference signal supply 2028 which provides a voltage $V_{ref}$. Thus, the conduction channel of the sense VCI 2020 is connected in series between the conduction channel of the select VCI 2038 and the input of the read-out circuit for the column. The select VCI 2038 therefore acts as a switch that, when open, connects the sense VCI 2020 between, $V_{ref}$, the reference signal supply 2028 and the input of the read-out circuit and, when closed, disconnects the sense VCI from the reference signal supply 2028. In the interests of clarity, the connection between the conduction channel of the select VCI and $V_{ref}$, the output of the reference signal supply 2028 is shown only in the top row of the array of pixels. The connection reference signal supply 2028 in the lower rows of the array is indicated in the drawing using the label $V_{ref}$.

The select VCI 2038 is therefore operable to inhibit the provision of signal from any inactive pixel to the input of the read-out circuit 2026. This can help to ensure that signal is only received from active pixels (e.g. those in the row to which the gate drive pulse is being applied).

In an embodiment each column of pixels is virtually connected to a ground or reference voltage. As such there may be no voltage differences on each of the columns thereby minimising parasitic capacitance. Furthermore, the reference signal supply may apply a current-drive rather than a voltage-drive which further reduces any effect parasitic capacitance could have on the signal applied by the active pixels on the inputs of the read-out circuit 2026.

The gate drive channel for the pixel row is connected to the first plate of the reference capacitor 2016, and to the control terminal of a select VCI 2038. As in the pixel illustrated in FIG. 7, and FIG. 8, the connection to the reference capacitor 2016 and capacitor sensing electrode 2014 means that the gate drive voltage is divided between the reference capacitor 2016 and the capacitive sensing electrode 2014 to provide the indicator voltage which controls the sense VCI 2020. The connection to the control terminal 2040 of the select VCI 2038 however means that, when the pixel is not active, the conduction path of the sense VCI 2020 is disconnected from the reference signal supply 2028.

A control terminal 2022 of the sense VCI 2020 is connected to the second plate of the reference capacitor 2016. The conduction path of the sense VCI 2020 connects the reference signal supply 2028 to the input of the read-out circuit 2026 for the pixel's column.

A conduction path of the reset VCI 2034 is connected between the second plate of the reference capacitor 2016 and a voltage output of the reset voltage provider, for receiving the reset voltage. The control terminal 2032 of the reset VCI 2034 is connected to a reset signal provider, such as the gate drive channel of another row of the sensor array. This can enable the reset VCI 2034 to discharge the reference capacitor 2016 during activation of another row of the array (e.g. a row of the array which is activated on the gate pulse prior to the pixel's row) or to pre-charge the control terminal 2022 of the sense VCI 2020 to the reset voltage.

Operation of the sensor array of FIG. 9 will now be described.

The gate drive circuit 2024 and the read-out circuit 2026 each receive a clock signal from the controller 2006. In response to this clock signal, the gate drive circuit 2024 activates a first gate drive channel of the gate drive circuit 2024 to provide a gate pulse to a row of the array 2010. A control voltage is thus applied to the control terminal of the select VCI 2038 of the pixels in the first row (the active row during this gate pulse).

The control voltage is also applied to the control terminal of the reset VCI 2034 of the pixels in a second row (inactive during this gate pulse).

In the first row (the active row), the conduction channel of the select VCI 2038 is switched into a conducting state by the control voltage (e.g. that which is provided by the gate pulse). The conduction channel of the select VCI 2038 thus connects the conduction channel of the sense VCI 2020 to the reference signal supply 2028.

The control voltage is also applied to the first plate of the reference capacitor 2016. The relative division of voltage between the sensing electrode 2014 and the reference capacitor 2016 provides an indicator voltage at the connection between the reference capacitor 2016 and the capacitive sensing electrode 2014 as described above with reference to FIG. 7 and FIG. 8. The indicator voltage is applied to the control terminal 2022 of the sense VCI 2020 to control the impedance of the conduction channel of the sense VCI 2020. Thus, the sense VCI 2020 connects the reference signal supply 2028 to the input channel of the read-out circuit 2026 for that column, and presents an impedance between the two which indicates the capacitance of the capacitive sensing electrode 2014. Please note, the reference signal supply may be provided by a constant voltage current supply.

A current is thus provided through the conduction path of the sense VCI 2020 from the reference signal supply 2028 to the input channel of the read-out circuit 2026 for the pixel's column. This current is determined by the voltage of the reference signal supply and by the impedance of the conduction channel of the sense VCI.

In response to the same clock signal from the controller 2006, the read-out circuit 2026 senses the pixel output signal at each input channel (e.g. by integrating the current provided to each input channel), and digitises this signal. The integration time of the read-out circuit 2026 may match the duration of the gate pulse.

Thus, in each clock cycle, the read-out 2026 circuit obtains a set of digital signals, each signal corresponding to the signals sensed from each column of the active row during the gate pulse. The output from each pixel 2012 in the row (each channel during that gate pulse) being indicative of the charge stored on the capacitive sensing electrode in that pixel.

In the second (inactive) row the control voltage is applied to the control terminal 2032 of the reset VCI 2034. This causes the reset VCI 2034 of the pixels in the inactive row to connect the second plate of their reference capacitors 2016 to a reset voltage provided by the reset voltage provider. This may discharge (e.g. at least partially remove) charge accumulated on the pixels of the inactive row, or it may charge them to the reset voltage, before they are next activated in a subsequent gate pulse. This reset voltage may be selected to tune the sensitivity of the pixels.

At the boundaries of the pixel array, where an N−1 gate line is not available, a dummy signal may be used to provide the control signal to the reset VCI. The gate drive circuit 2024 may provide the dummy signal. This may be provided by a gate drive channel which is only connected to the reset VCIs of a row at the boundary of the array, but not to any sense or select VCIs.

As illustrated in FIG. 9, the reset VCI 2034 of the pixels may be connected to the gate drive circuit so that each row is discharged in this way by the gate pulse which activates the immediately preceding row, which may be an adjacent row of the array.

Figure 10:
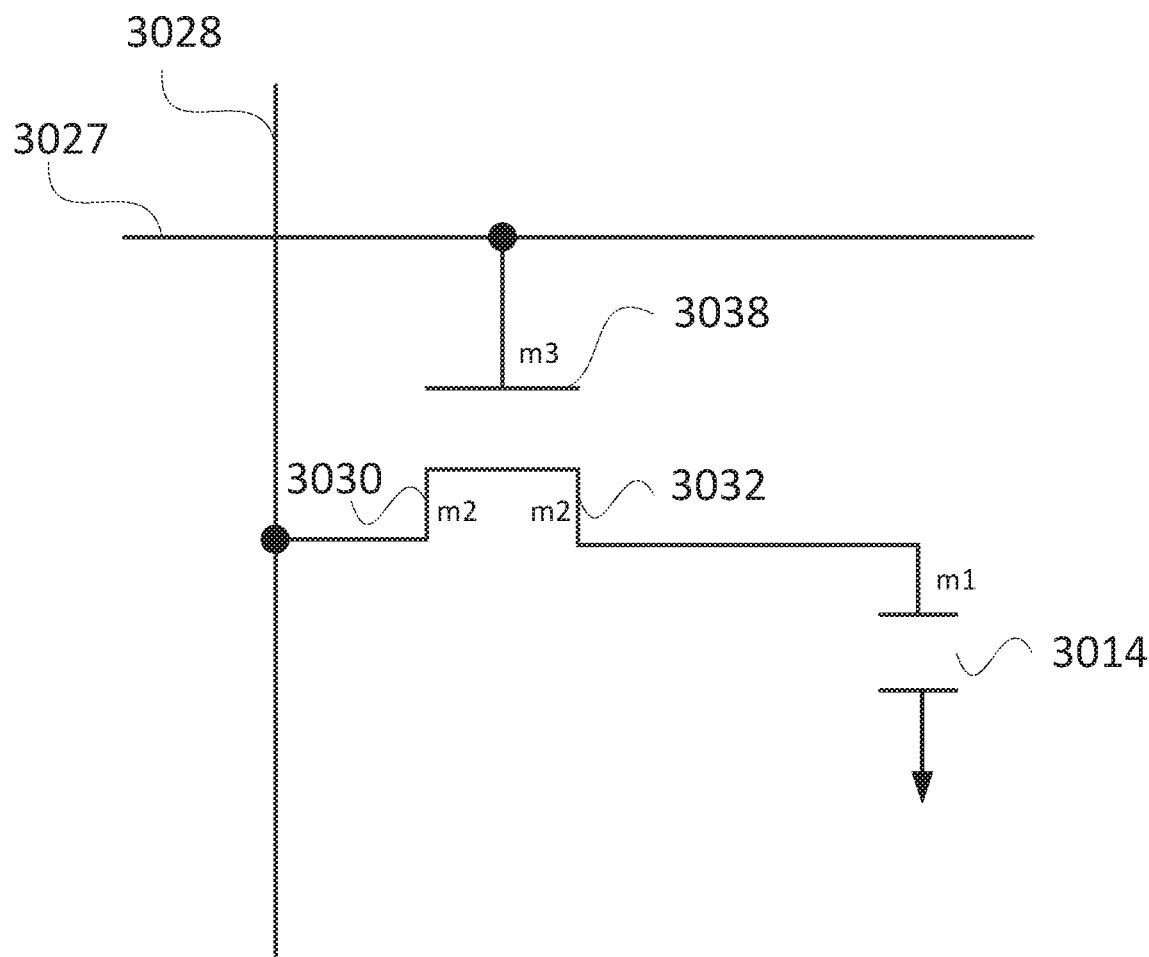
FIG. 10 is a schematic diagram of a pixel circuit diagram of a top gate structure of a pixel in a pixel array.

In other examples of pixel structures, a reference capacitor need not be provided. FIG. 10 illustrates one example pixel circuit in which a reference capacitor is not provided. This pixel circuit can be formed from the above described structure and deposition methods. The circuit comprises a TFT 3030, 3032, 3038, and a capacitive sensing electrode 3014. The pixel circuit may be addressed by a gate line 3027 and a source-data line 3028, and outputs to a common line, for example a Vcom connection. The TFT comprises a source region 3030, a drain region 3032 and a gate electrode 3038. The gate line 3027 is connected to the gate electrode 3038. The source region 3030 is connected to the source-data line 3028. The capacitive sensing electrode is connected to the drain region 3032, which is connected to the source region 3030, as shown in FIG. 10.

The example pixel circuit of FIG. 10 may be provided by a layered pixel structure. For example the layered pixel structure may comprise three conductive layers m1, m2, m3 are provided. These may be metallisation layers, such as those deposited in the above method. A first metallization layer m1 provides the capacitive sensing electrode 3014. The first metallization layer m1 may be deposited on a carrier substrate, such as a dielectric shield. A second metallisation layer, m2, provides the source 3030 and drain 3032 region of the TFT. The second layer m2 may be the type as would be provided in a top gate arrangement (see e.g. FIG. 1, Inset A). A third metallisation layer, m3, provides the gate electrode 3038. In a bottom gate configuration (see FIG. 2, Inset B), second and third metallisation layers are reversed. A conductive via may be provided to provide an electrical connection between the capacitive sensing electrode 3014 and the drain region 3032 of the TFT, as can be seen in FIG. 10.

As illustrated in FIG. 10, the deposited metal layers denoted as m1, m2 and m3 adjacent the features of the circuit in FIG. 10 can be connected to form the circuit. The illustrated circuit components of the circuit diagram in FIG. 10 may depict both top gate and bottom gate arrangements. A top gate configuration is illustrated in FIG. 10, but it will be appreciated that m2 and m3 can be swapped in order to correspond to a bottom gate configuration.

In some examples, a reference capacitor could be included in the pixel circuit of FIG. 10. The reference capacitor may be connected to the drain region 3032. For example, one of the plates of the reference capacitor may be provided by the second metallisation layer. A second plate of the reference capacitor may also be provided by the third metallisation layer. The second plate of the reference capacitor may be separated from the gate electrode 3038, for example by patterning (e.g. lithography or etching) during manufacture.

It will be appreciated that the disclosure, as a whole, may be used to provide pixel circuits such as that described with reference to FIG. 10, It will however also be appreciated in the context of the present disclosure that other circuits may also be used, whereby the layers of the pixel are connected in a different manner such that a different circuit is made. The fundamental layers and the method of deposition methods would remain substantially consistent with the above disclosed embodiments. Advantages achieved by using the surface to be touched in a touch sensor also as the substrate for deposition of the pixel stack may of course be provided in other pixel circuits.

It will be appreciated from the above description that many features of the different examples are interchangeable with one another. The disclosure extends to further examples comprising features from different examples combined together in ways not specifically mentioned. Indeed, there are many features presented in the above examples and it will be apparent to the skilled person that these may be advantageously combined with one another.

Certain features of the methods described herein may be implemented in hardware, and one or more functions of the apparatus may be implemented in method steps. It will also be appreciated in the context of the present disclosure that the methods described herein need not be performed in the order in which they are described, nor necessarily in the order in which they are depicted in the drawings. Accordingly, aspects of the disclosure which are described with reference to products or apparatus are also intended to be implemented as methods and vice versa. The methods described herein may be implemented in computer programs, or in hardware or in any combination thereof. Computer programs include software, middleware, firmware, and any combination thereof. Such programs may be provided as signals or network messages and may be recorded on computer readable media such as tangible computer readable media which may store the computer programs in non-transitory form. Hardware includes computers, handheld devices, programmable processors, general purpose processors, application specific integrated circuits (ASICs), field programmable gate arrays (FPGAs), and arrays of logic gates.

The invention claimed is:

1. A pixel structure comprising a plurality of layers for providing a touch sensitive pixel of a sensing array, the layers comprising:
    a thin film transistor;
    a gate layer of the pixel structure comprising a gate region of the thin film transistor; and
    a conductive layer deposited on a dielectric shield to be touched by an object to be sensed and arranged to provide a capacitive sensing electrode coupled to the thin film transistor,
    wherein the dielectric shield provides a substrate on which the layers of the pixel structure are disposed,
    wherein the thin film transistor comprises a plurality of layers deposited on the capacitive sensing electrode,
    wherein the gate layer is connected to the capacitive sensing electrode.

2. The pixel structure of claim 1 wherein the dielectric shield comprises a first surface to be touched by the object to be sensed; and
    wherein the capacitive sensing electrode is disposed on a second surface of the dielectric shield.

3. The pixel structure of claim 1 wherein an insulating layer separates the capacitive sensing electrode from the thin film transistor.

4. The pixel structure of claim 3 wherein the capacitive sensing electrode is connected to the thin film transistor by a conductive via through the insulating layer.

5. The pixel structure of claim 1 wherein a source-drain layer of the pixel structure comprises a source region and a drain region of the thin film transistor.

6. The pixel structure of claim 5 comprising a channel region comprising a semiconductor, which connects the source region and the drain region of the thin film transistor in an "on" state.

7. The pixel structure of claim 1 comprising a reference capacitor.

8. The pixel structure of claim 7 comprising an input for coupling a bias voltage to a first plate of the reference capacitor for pre charging the pixel.

9. A method of manufacturing a pixel structure comprising a plurality of layers for providing a touch sensitive pixel of a touch sensitive array, the method comprising:
    depositing a conductive layer on a first surface of a dielectric shield and arranged to provide a capacitive sensing electrode, wherein the dielectric shield comprises a second surface, opposite to the first surface, and arranged to be touched by an object to be sensed by the pixel; and
    fabricating a thin film transistor wherein the thin film transistor is connected to the capacitive sensing electrode,
    depositing a gate layer of the pixel structure, the gate layer comprising a gate region of the thin film transistor, and connecting the gate layer to the capacitive sensing electrode,
    wherein the thin film transistor is fabricated over the capacitive sensing electrode.

10. The method of claim 9 comprising:
    depositing a passivation layer between the capacitive sensing electrode and the thin film transistor.

11. The method of claim 10 wherein a connection between the capacitive sensing electrode and the thin film transistor comprises a conductive via through the passivation layer.

12. The method of claim 9 wherein fabricating the thin film transistor comprises:
    depositing a source-drain layer;
    wherein the source-drain layer comprises a source region and a drain region of the thin film transistor.

13. The method of claim 12 wherein fabricating the thin film transistor further comprises depositing a channel region adjacent the source-drain layer and a gate-insulator layer between the channel region and the gate layer.

14. The method of claim 9 further comprising fabricating a reference capacitor arranged to be connected to the thin film transistor and the capacitive sensing electrode.

15. A pixel structure comprising a plurality of layers for providing a touch sensitive pixel of a sensing array, the layers comprising:
    a thin film transistor; and
    a conductive layer deposited on a dielectric shield to be touched by an object to be sensed and arranged to provide a capacitive sensing electrode coupled to the thin film transistor,
    wherein a source-drain layer of the pixel structure comprises a source region and a drain region of the thin film transistor,
    further comprising a gate layer of the pixel structure comprising a gate region of the thin film transistor,
    wherein the gate layer is connected to the capacitive sensing electrode.

* * * * *